United States Patent [19]
Offer et al.

[11] Patent Number: 5,958,261
[45] Date of Patent: Sep. 28, 1999

[54] APPARATUS FOR WELDING WITH PREHEATED FILLER MATERIAL

[75] Inventors: Henry Peter Offer, Los Gatos; Leonard John Sharpless, Palo Alto, both of Calif.

[73] Assignee: General Electric Company, San Jose, Calif.

[21] Appl. No.: 08/896,119

[22] Filed: Jul. 17, 1997

[51] Int. Cl.⁶ .................................................. B23K 9/167
[52] U.S. Cl. .............................................. 219/75; 219/136
[58] Field of Search ...................... 219/75, 136, 137.43, 219/137 R, 74, 125.11

[56] References Cited

U.S. PATENT DOCUMENTS

| | | | |
|---|---|---|---|
| 3,992,603 | 11/1976 | Reynolds | 219/136 |
| 4,110,590 | 8/1978 | Batey et al. | 219/75 |
| 4,343,983 | 8/1982 | Schneider et al. | 219/146.21 |
| 4,591,685 | 5/1986 | Hinger et al. | 219/136 |
| 4,617,444 | 10/1986 | Engelhard et al. | 219/75 |
| 4,639,575 | 1/1987 | Asano | 219/136 |

FOREIGN PATENT DOCUMENTS

| | | | |
|---|---|---|---|
| 58-181472 | 10/1983 | Japan | 219/75 |
| 62-45474 | 2/1987 | Japan | 219/125.11 |

*Primary Examiner*—Clifford C. Shaw
*Attorney, Agent, or Firm*—James E. McGinness; Dennis M. Flaherty

[57] ABSTRACT

A hot-wire nozzle for feeding pre-heated filler material into a welding groove. The nozzle has a contact tube made of electrically conductive material surrounded by a thin structural outer sheath. The outer sheath is electrically insulated from the contact tube by means of layers of electrically insulating material sandwiched between the contact tube and the outer sheath. The contact tube is configured to feed two or more filler wires simultaneously.

27 Claims, 6 Drawing Sheets

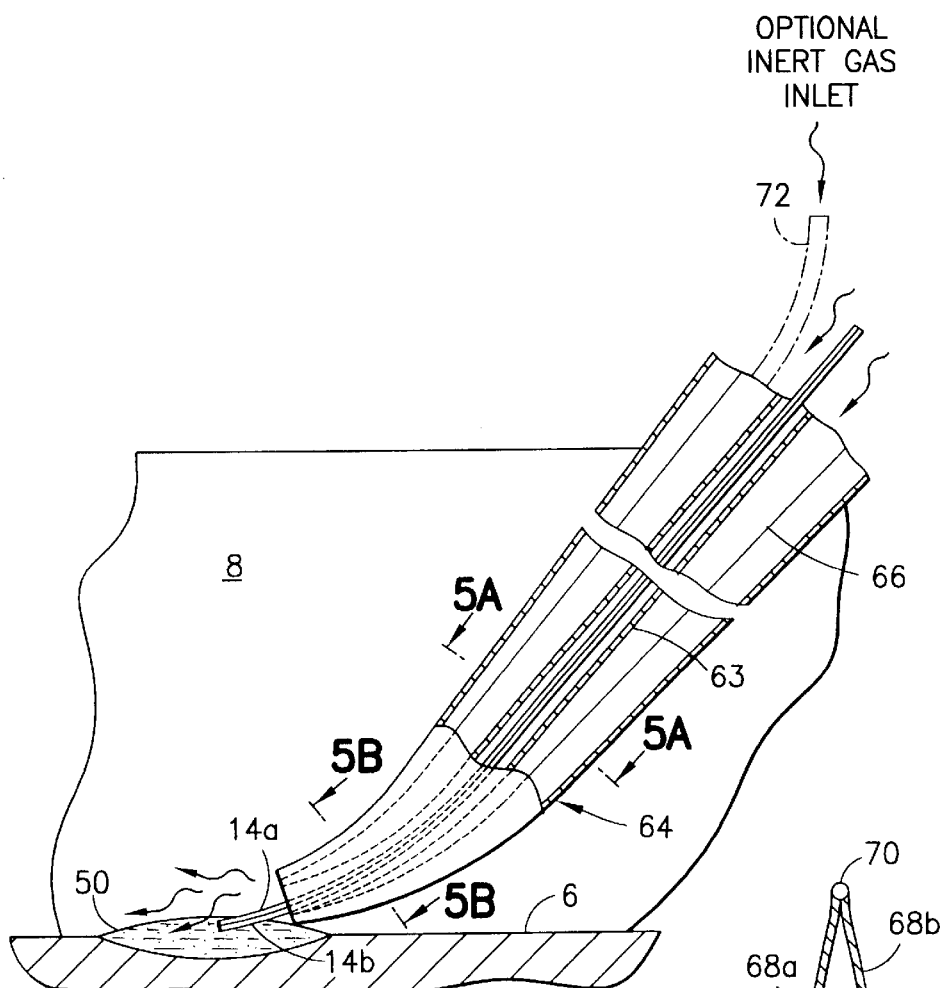
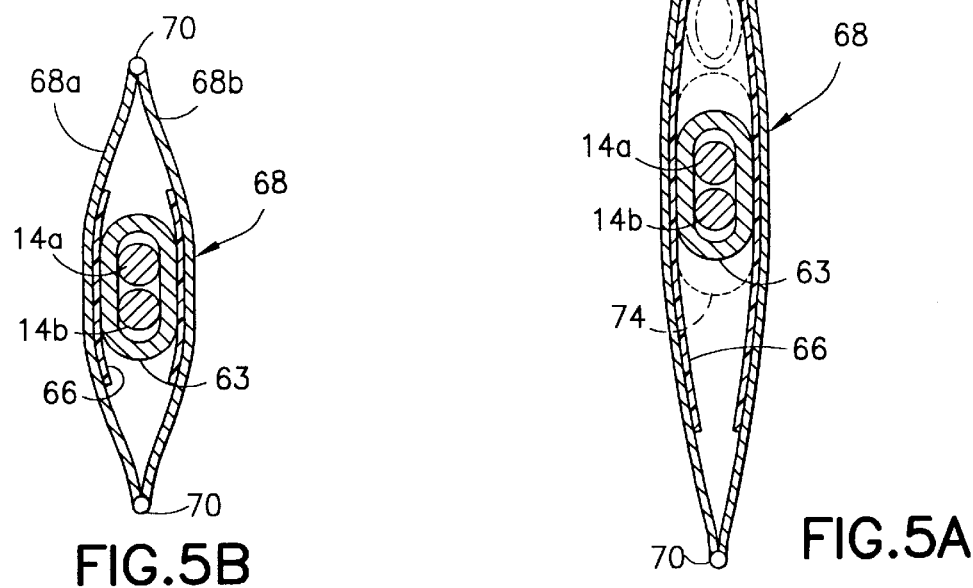
FIG.5
FIG.5B
FIG.5A

APPARATUS FOR WELDING WITH PREHEATED FILLER MATERIAL

FIELD OF THE INVENTION

This invention relates to the automated welding of metal components. In particular, the invention relates to automated welding in a groove of small width using a flat welding electrode.

BACKGROUND OF THE INVENTION

A method known in the industry as "hot-wire" filler material addition is utilized in various welding processes to increase the filler deposition rate over that which can be achieved with cold-wire addition. This "hot-wire" effect is achieved by applying additional power to preheat the filler (usually in the form of a continuously fed wire). The resulting benefits are to melt filler of a predetermined composition and size with a given arc current at a faster rate, or to melt filler of a larger size at a similar rate, or to increase both the feed rate and the filler size simultaneously for a maximum increase in the filler deposition rate. "Hot-wire" filler addition is practiced in the known welding art with either alternating or direct current from an additional, electrically isolated power supply. This current is applied to the filler material by means of an electrical contact nozzle through which the filler is fed. In this design, the nozzle is not electrically connected in a parallel circuit to the power supply for the arc, and therefore the voltage of the nozzle is independent of the arc voltage. In a known configuration, the filler material is heated between the end of the conductive nozzle and the "grounded" workpiece.

In another design that is uncommon in the welding industry, the nozzle is electrically connected in a parallel circuit to the power supply for the arc, and therefore the voltage of the nozzle is dependent on the arc voltage. This variation is known as "shunted-arc" hot-wire addition. It is known to exist only with the geometry where the non-consumable electrode and the filler nozzle are both approximately perpendicular to the work surface, i.e., with "vertical" wire feed. This geometry is intended for robotic joining applications to avoid the problem where, if the nozzle were inclined to the workpiece, then an additional rotation of the torch assembly would be required to maintain the nozzle in the same orientation with respect to the travel direction for nonlinear joint path shapes.

The resistive heating in the filler occurs as the electrical power is dissipated in the length extending between the end of the contact tube and the point where it enters the molten pool. This predetermined length of filler extension is essentially an electrical resistor with a continuously replenished resistive element. The degree of heating is independently determined by the feed rate, the length of filler from the contact tube to the workpiece, and the applied voltage for a predetermined filler size and material type. The voltage drop across this heated length is dependent upon the these independently set parameters. The current through this heated length is typically a dependent parameter, controlled according to Ohm's Law.

SUMMARY OF THE INVENTION

The present invention is a hot-wire filler nozzle for use with electric arc welding (or arc brazing). The invention is especially useful in high-efficiency joining applications with very high aspect-ratio groove designs, although it can be beneficially applied to cladding, build-up, repair and other joining geometries for welding as well.

In accordance with the preferred embodiment of the invention, the hot-wire filler nozzle comprises a contact tube made of electrically conductive material surrounded by a thin structural outer sheath. The outer sheath is electrically insulated from the contact tube by means of layers of electrically insulating material sandwiched between the contact tube and the outer sheath.

Preferably, both the contact tube and the outer sheath are curved in the plane of the joint so as to control the direction of the "cast" (curved shape resulting from having been wound on a spool) wire. Curvature in a direction which diverges from the work surface also has the benefits of a lower filler entry angle into the pool, as well as a shorter length required to extend through the thickness of the work, when oriented at an angle with respect to its surface (other than 90 degrees).

In accordance with the preferred embodiment, the contact tube is designed to allow simultaneous feeding of multiple filler wires into reduced-width, high aspect-ratio (ratio of depth-to-width) weld or braze joints. The use of a multiple-filler-wire nozzle facilitates joining with improved control and stability of the filler material position as it enters the heat source and adjacent molten pool area. The apparatus also provides higher filler melting thermal efficiency and corresponding deposition (melt-off) rates, resulting in joint material properties and joining productivity benefits significantly above conventional, more complex practices. In accordance with the preferred embodiment, two or more filler wires can be fed to a predetermined small area in or near the edge of a molten pool of metal, which when solidified joins the parent materials in a welding operation. A preferred application for the invention is a joint design with the sidewalls close enough to each other so that they can be reliably bridged by a single fill pass per layer, without the use of cross-seam oscillation (lateral manipulation of the heat source, filler nozzle, or both relative to the work pieces). The multiple filler wires may be fed either by a single drive system, or by multiple drive systems which have a means of allowing the wires to converge before or as they enter the nozzle. For a filler nozzle comprising a flattened tube with a single hole, the entrance end of the hole may be circular (as in an unflattened tube) in the portion of the nozzle not extending into the joint. The fillers will naturally orient themselves along the major axis of the non-circular portion of the hole.

The orientation of the wires at the outlet of the filler nozzle can be directly in line with or inclined relative to the direction of the heat source (such as the axis of an electric arc or laser beam), which places the wires in a chosen position in the lateral temperature distribution of the heat source. One preferred position is in line with the tip of an electric arc electrode, where the plasma temperatures are the highest and the filler melting rate is greatest.

The apparatus of the invention provides improved position control of the filler material as it enters the molten pool during weld joining processes. For joining materials utilizing a thin joint design having a significantly high aspect ratio (of joint depth to width), a minimum thickness, stable position nozzle is desired in order to minimize joint width, and therefore minimize joint volume for a predetermined parent material thickness. Reductions in joint volume can lead directly to reductions in the amount of filler material required and the corresponding welding time to deposit the filler, thereby reducing welding costs. The nozzle can be used with many welding or torch brazing processes, and is suited for either cold-wire or hot-wire filler addition.

In accordance with the invention, the guide nozzle allows simultaneous feeding of multiple, parallel filler wires which are positioned closely adjacent to or in contact with each other through a single non-circular hole or through multiple circular holes. This configuration enables the nozzle to be thinner than if a single wire of greater thickness were used, and more positionally stable than if multiple nozzles of a similar thickness were used. The design having a noncircular hole enables the nozzle to be easier to fabricate than a multi-hole nozzle of the same thickness.

In accordance with a further aspect of the invention, a gas distribution channel or tube can be incorporated inside the outer sheath for feeding welding or shielding gas into the weld groove. The outlet of the gas distribution channel or tube is located to distribute inert gas which displaces the ambient atmosphere overlying the molten pool area at the bottom of the weld groove, thereby preventing contamination of the molten weld material. Gas diffusing means are incorporated in the distal end of the filler nozzle/gas distribution tube assembly.

BRIEF DESCRIPTION OF THE DRAWINGS

FIG. 5 is a schematic showing partly sectional view of a hot-wire filler nozzle in accordance with the preferred embodiment of the invention.

FIGS. 5A and 5B are schematics showing sectional views of the preferred embodiment depicted in FIG. 5, the sections being taken along lines 5A—5A and 5B—5B in FIG. 5, respectively. FIG. 5A shows optional gas distribution features, whereas FIG. 5B, for the sake of clarity, does not.

DETAILED DESCRIPTION OF THE PREFERRED EMBODIMENTS

The present invention can be used as part of a gas tungsten arc welding (GTAW) system adapted for welding a reduced-width groove to form a welded joint between two parts. The GTAW system has mechanized torch movement and a tungsten electrode with a geometry designed to fit in the reduced-width groove. The sidewalls of the groove preferably have an acute angle less than 5°. The blade of the electrode has a non-circular cross section. In particular, the blade cross section has an elongated dimension which is oriented parallel to the length of the weld joint and a shortened dimension which is oriented perpendicular to the length of the joint, e.g., a cylinder having a generally rectangular cross section.

The weld beads are deposited inside the groove using the thin elongated tungsten alloy electrode to melt the filler wire fed into the groove by a filler material nozzle. The electrode fits inside the groove with clearance between the electrode and the sidewalls. The blade of the electrode is optionally covered with a ceramic coating to prevent arcing to the sidewalls of the groove. The welding electrode is powered by a conventional arc power supply to produce an arc.

Figure 1:
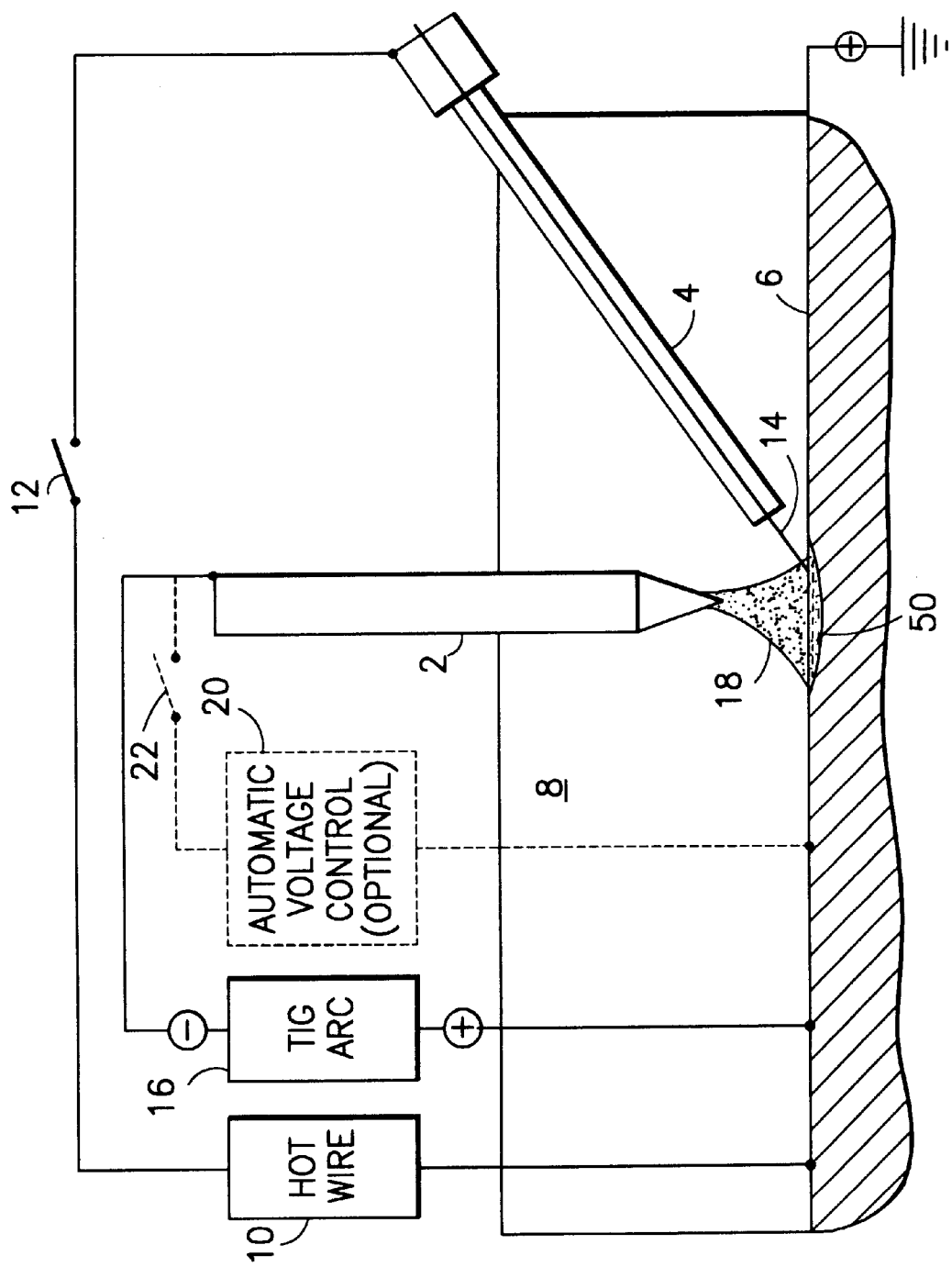
FIGS. 1 and 2 are schematics showing hot-wire welding apparatus having a vertical electrode and an inclined hot-wire filler nozzle arranged in a sectioned open weld joint and further having dual (FIG. 1) and single (FIG. 2) power supplies.
Figure 2:
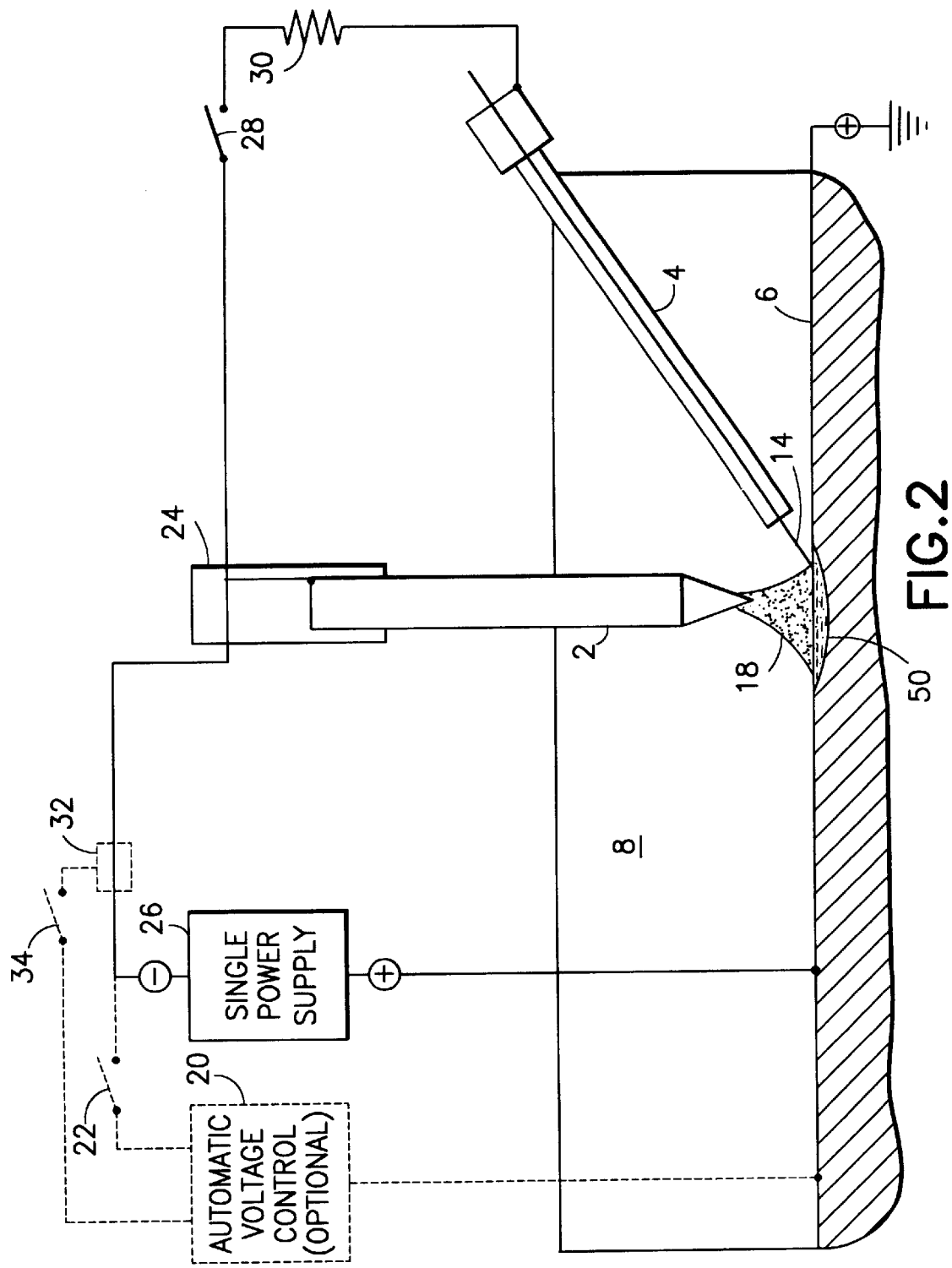

In accordance with the hot-wire welding systems depicted in FIGS. 1 and 2, a vertical electrode 2 and an inclined filler nozzle 4 are arranged relative to a work surface 6. The electrode and filler nozzle are aligned in the plane of a groove extending above the work surface and formed by a first sidewall 8 and a second sidewall (not shown) opposing the first sidewall. The sidewalls are preferably mutually parallel or form a very small angle, e.g., a few degrees.

Referring to FIG. 1, a hot-wire power supply 10 is connected to the filler nozzle 4 via a switch 12. When switch 12 is open, the filler wire 14 is fed cold, i.e., without preheating, out of the filler nozzle 4. The filler nozzle is positioned such that the tip of the filler wire is immersed in the weld puddle 50 formed beneath the arc 18. When switch 12 is closed, electrical power from the hot-wire power supply 10 is used to preheat the filler wire 14. For TIG welding, the electrode powered by the TIG arc power supply 16, forming an arc 18 between the tip of the electrode 2 and the work puddle 50. The tip of the preheated filler wire 14 is melted by arc and/or the superheated weld puddle, depending on the wire aim position. As the electrode and filler nozzle travel in unison along the groove, the trailing edge of the weld puddle cools and fuses to form a weld bead. This process continues until a weld pass is completed.

During each weld pass, the arc voltage is preferably maintained constant by variation of the arc length as the electrode travels in the groove. When both the arc and filler material are provided current by the same power supply, it can be advantageous to utilize an AVC servo system to maintain a constant total voltage (in addition to the constant total current). This is accomplished using a conventional automatic voltage control (AVC) servo system 20, which is electrically connected to the electrode 2 via a closed switch 22. When switch 22 is open, the electrode is operated without automatic voltage control.

In accordance with the hot-wire welding system shown in FIG. 2, the electrode holder 24 (and therefore the arc 18 at the tip of the electrode 2) and the filler nozzle 4 (and therefore the portion of the filler wire 14 exiting the tip of the conductive nozzle) are electrically common, and are both at approximately the same voltage relative to the workpiece 6. When the filler wire 14 is in contact with the workpiece 6, arc 18 and wire 14 share the total current from a single constant-current power supply 26, according to Kirchoff's Law for electrical resistances connected in a parallel circuit. Depending on the welding parameters selected to produce the desired condition of weld deposit, the total current level may be programmable to vary with other predetermined values such as the filler material feed status (off or on), the filler feed speed, the electrode travel position or with the weld sequence time.

In accordance with a further feature, a switch 28 is installed in the connection between the electrode holder 24 and the filler nozzle 4 (see FIG. 2). When switch 28 is open, the system can be operated in the cold-wire feed mode, or in the hot-wire mode with two power supplies. The system can operate without filler feed with the switch either open or closed. The system can be readily reconfigured by closing switch 28 to be in the hot-wire mode, powered by one supply. Other variations of the system shown in FIG. 2 use an adjustable current-controlling circuit to adjust the current distribution between the electrode and the filler, while maintaining a constant-current source.

In accordance with a further variation, the voltage supplied to heat the filler material can be reduced below that supplied to the arc by the use of an additional resistive element 30 (see FIG. 2) in the circuit to the filler nozzle assembly. Alternatively, the inverse configuration may be used to maintain the arc at a relatively lower voltage. Predetermined or changeable filler voltage adjustments may be made as required to suit different welding conditions if this added resistive element is replaced with ones of different values, or generally made variable. The resistive element can be made a part of the nozzle assembly, which would enable the heat generated by the resistance to be used to additionally heat the incoming wire by thermal conduction.

In accordance with yet another variation, a current sensing device 32 is connected to the branch of the circuit to the wire nozzle 4. Alternatively, the current sensor can be connected to the circuit branch to the electrode holder 24. For a programmable level of total current, the current in either branch can be advantageously controlled based on the value measured in one branch. The value in the first branch is equal to the total current minus the value in the second branch. The value of the total current may vary with the progression (weld time or arc position) of the joining process.

Using either of the above-described hot-wire welding systems, the overall thermal efficiency of heating the workpiece by pre-heating of the wire can be made higher than the efficiency of workpiece heating with the arc. The higher efficiency of the wire resistance heating is due in part to the lower losses from convection and radiation to the surrounding environment, relative to these losses from the arc. Additional arc heat is lost by thermal conduction in the electrode. The remaining arc heat is primarily transferred directly to the workpiece rather than to the wire (and subsequently to the workpiece), since the projected area of the diverging arc onto the work is several times greater than the projected area onto the relatively thin wire.

It is known that for many joining applications using TIG welding arcs, the arc voltage and current characteristically increase or decrease together above a relatively low current value. Therefore with the single-power supply circuit, as the wire contacts the work and the prior arc current decreases and is then shared with the wire, the arc voltage decreases also without an AVC type of response. As a result, the total power will also decrease, which may be highly desirable in those cases where the maximum heat input requires control. In other cases where a constant heat input control is required, an AVC control system combined with a single, constant-current TIG power supply may be used and constant power achieved. In conventional (separate power supply) hot-wire addition, the power generated in the resistance-heated wire adds to the arc power to yield an increased total power with a value greater than that produced by the parallel-circuit arc with hot wire and AVC (which can automatically maintain constant total power). For example, when switches 22 and 34 in FIG. 2 are closed, the circuit maintains constant total power independent of whether the filler material is fed or not, whether the filler is cold wire or hot wire, and its feed rate, if it is fed at any point of the sequence. In this variation, the total arc current (the sum of the arc and wire currents) is held constant by the "constant-current" design of the power supply, and the total voltage is held constant by the adjustment of the arc length (and therefore arc resistance) with an AVC servo system. With the hot-wire nozzle 4 electrically connected to the electrode 2, and when using a constant-current type of power supply with the AVC system enabled (see FIG. 2), the wire voltage is essentially fixed (except for transients at the beginning and end of the feed period). The arc voltage changes according to the AVC system adjustment, with the net result that the total voltage is held constant at the predetermined (programmed) value. Since the total current and total voltage are maintained constant, the electric total power input into the arc and heated wire is essentially constant, regardless of the filler feed rate.

Figure 3:
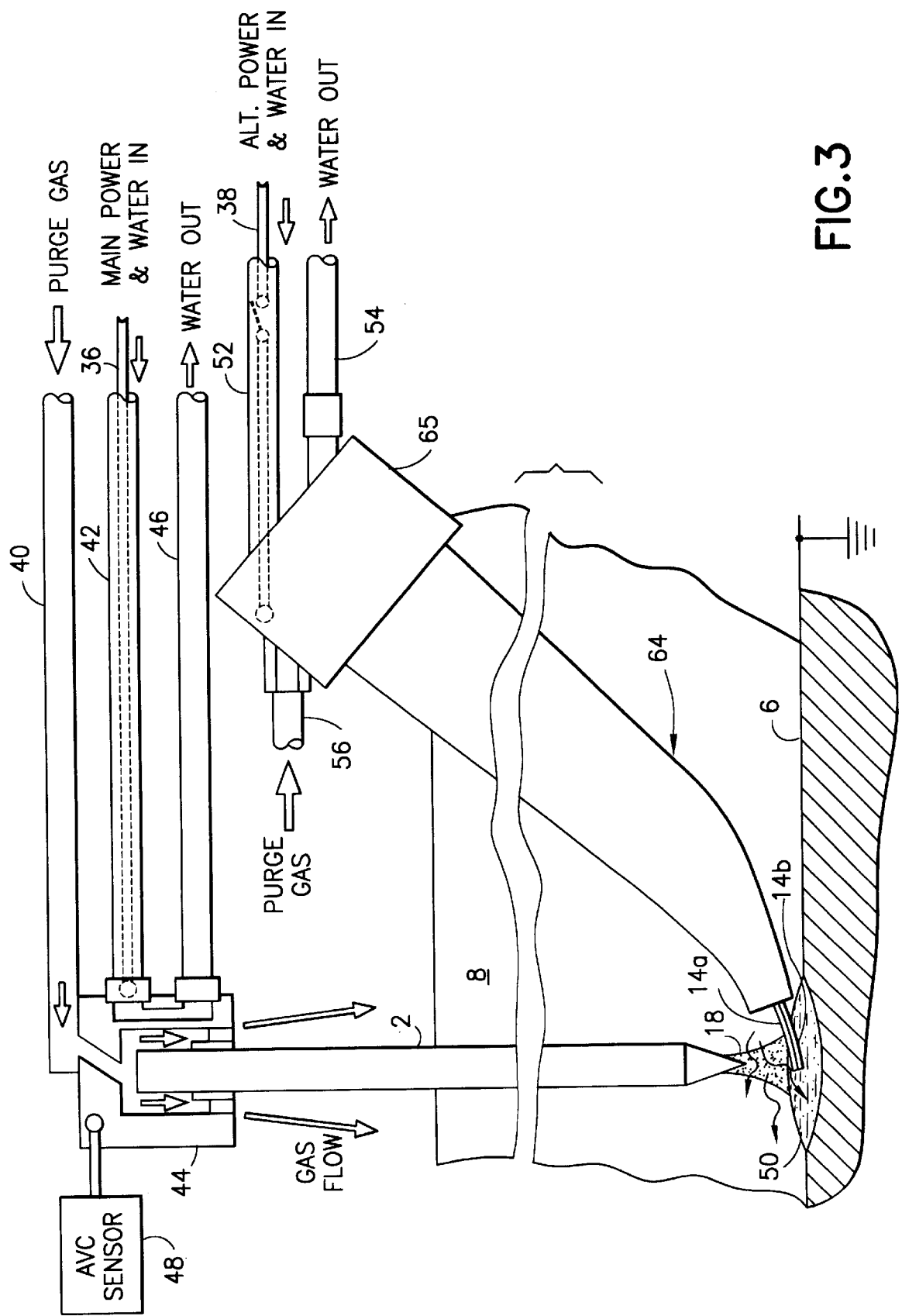
FIGS. 3 and 4 are schematics showing hot-wire welding apparatus in accordance with the present invention having a vertical electrode and an inclined hot-wire filler nozzle arranged in a sectioned open weld joint and further having dual (FIG. 3) and single (FIG. 4) power supplies.

The present invention is a multiple-hot-wire guide nozzle which can be used in either of the above-described systems in place of filler nozzle 4. FIG. 3 shows a multiple-hot-wire nozzle 64 in accordance with the preferred embodiment of the invention, incorporated in a hot-wire welding system having dual power supplies. The electrode 2 generates an arc 18 in response to the main power supplied via electrical line 36. The electrode holder 44 is water-cooled by recirculating water which enters the electrode holder via water inlet line 42 and exits the electrode holder via water outlet line 46. The water inlet line 42 also cools the electrical line 36, which passes through the water inlet line. The arc voltage is measured using an AVC sensor 48 coupled to the electrode holder 44. Purge gas is input to a gas cup incorporated in the electrode holder via a purge gas line 40. The purge gas exits the gas cup and flows toward the weld groove.

Similarly, the multiple-hot-wire nozzle 64 provides electrical current to two filler wires 14*a* and 14*b* in response to the alternate power supplied via electrical line 38. The nozzle 64 is water-cooled by recirculating water which enters the nozzle holder 65 via water inlet line 52 and exits the nozzle holder via water outlet line 54. The water inlet line 52 also cools the electrical line 38. Purge gas is input to a gas distribution device (not shown) incorporated in nozzle 64 and nozzle holder 65 via a purge gas line 56. The purge gas exits the distal end of the nozzle 64 and diffuses into the weld groove.

Figure 4:
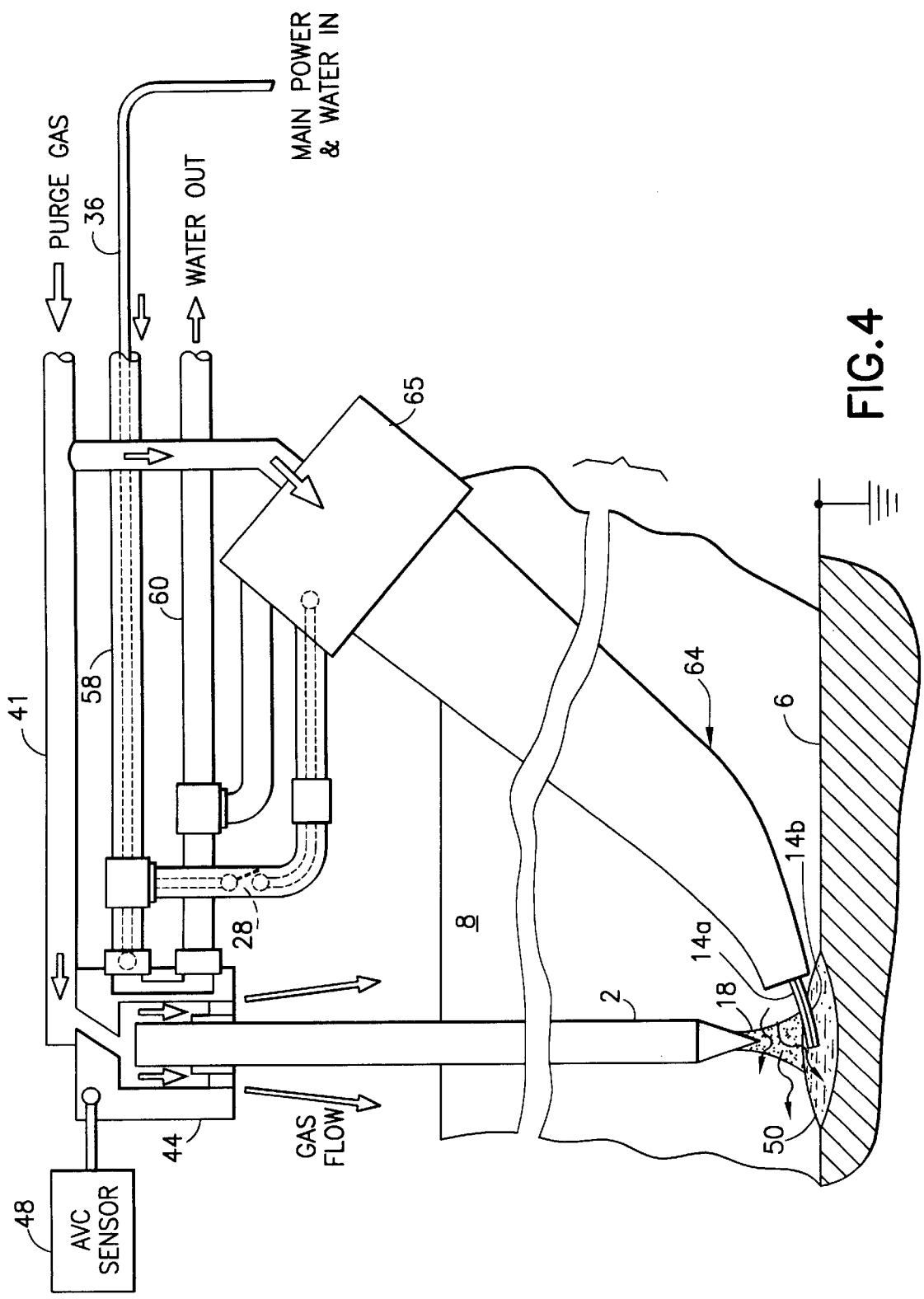

Alternatively, the welding electrode and the multiple-hot-wire nozzle can be powered by a single power supply, as shown in FIG. 4. The system shown in FIG. 4 differs from that shown in FIG. 3 in that in the electrode 2 and multiple-hot-wire nozzle 64 are both connected to the main power via electrical line 36. A switch 28 is installed in the branch of line 36 which connects the main power supply to the nozzle holder 65. Purge gas is provided to both electrode holder 44 and multiple-hot-wire nozzle 64 via purge gas line 41. The electrode holder 44 and nozzle holder 65 are both water-cooled via water inlet line 58 and water outlet line 60.

Figure 5C:
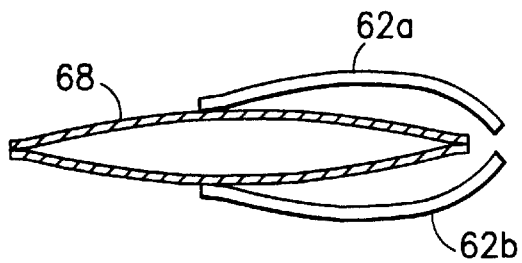
FIG. 5C is a schematic showing a sectional view of a portion of the outer sheath having centering leaf springs attached on both sides in accordance with one aspect of the present invention.

In accordance with the preferred embodiment of the invention shown in FIG. 5, the hot-wire filler nozzle 64 comprises a central contact tube 63 with a non-circular hole surrounded by a thin structural outer sheath 68 of non-circular cross section. The preferred materials are a copper contact tube sandwiched between two pieces of either hardened Inconel or stainless steel sheet stock. This assembly was constructed by electrical resistance spot welding the edges of two sheets 68*a* and 68*b* to each other to form a lenticular cross-sectional shape, as shown in FIGS. 5A and 5B. The spot welds are indicated by numeral 70. The contact tube 63 is held in place by the compressive force exerted by the pinched together sheets 68*a* and 68*b*. The contact tube depicted in FIGS. 5A and 5B is configured to receive two filler wires of equal diameter. However, the height of the tube can be increased as indicated by dashed line 74 in FIG. 5A, either to handle additional filler wires or to increase the amount of material carrying the hot-wire current.

For hot-wire welding, the contact tube 63 is preferably insulated from coming in electrical contact with the joint walls in order to prevent inadvertent grounding. One method of insulation is external and consists of bonding (such as braze) or mechanically capturing (such as mount in holes) several insulating standoffs which protrude beyond the surface extremities of sheath 68. However, the preferred method of insulation is to internally insulate the nozzle assembly by sandwiching a respective layer 66 (see FIG. 5B) of electrically insulating material between the contact tube 63 and each sheet 68a and 68b of the outer sheath 68. Each layer 66 may take the form of a coating deposited on the inner surface of each sheet 68a and 68b or a sheet material pinched or bonded between the sheath and contact tube. The insulation may be any one of various materials, such as thin mica mineral sheet, a metal oxide ceramic coating, or a diamond-like coating. Alternatively, an insulating coating may be deposited on the outer surface of the contact tube.

The multiple filler wires 14a and 14b may be fed either by a single drive system, or by multiple systems which have a means of allowing the wires to converge before or as they enter the contact tube 63. The entrance end of the hole may be circular (as in an unflattened tube) in the portion of the nozzle not extending into the joint. The filler wires 14a and 14b will naturally orient themselves along the major axis of the noncircular portion of the hole.

Figure 6:
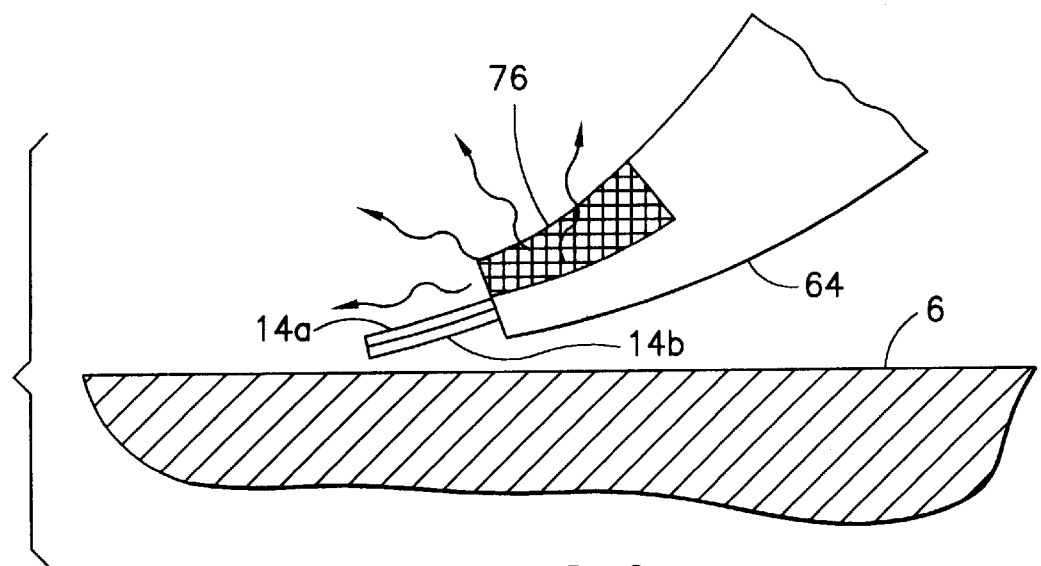
FIG. 6 is a schematic showing a side view of a hot-wire filler nozzle having gas distribution and diffusing means incorporated therein in accordance with another preferred embodiment of the invention.

An additional nozzle variation with compound functions incorporated a stainless steel flattened weld/purge gas delivery tube 72 (indicated by dashed lines in FIGS. 5 and 5A) extending within the sheath 68, located parallel to the contact tube 63 and ending near the outlet end of the nozzle. In the vicinity of the nozzle outlet, the sheath material was changed to microdrilled (electroformed) sheet 76 (see FIG. 6), to allow the gas to escape within the joint near the molten pool and arc. This method prevents gas jetting and unnecessary turbulence, resulting in a desired laminar flow condition with minimum contamination by the remaining atmosphere in the joint. A significant reduction in the required minimum flow rate of gas was realized, relative to the practice of feeding gas from the outside of the joint. The degree of reduction in flow rate ranged from a factor of two to three, depending on the aspect ratio of the joint dimensions. Gas diffusing means different than microdrilled sheet may be incorporated in the outlet end of the nozzle 64.

A further aspect of the invention is the employment of a passive means of mechanically centering the outlet end of the nozzle between the sidewalls. The preferred embodiment of such a centering means is a pair of leaf springs 62a and 62b (see FIG. 5C) mounted to the sheath 68 along a portion of the nozzle 64 residing within the joint. Alternatively, cantilever springs can be used. The centering means must be configured such that they move easily with the heat source while in contact with the sidewalls. This self-centering effect allows the nozzle to be effectively used in very thin, deep joints while maintaining the critical alignment between the filler and heat source, as is necessary for maximum deposition rates with minimum heat input. The centering action of the springs may be overridden by the operator as required during mechanized joining, to compensate for occasionally excessive misalignment between the filler material and the preferred position. This misalignment may be due to factors such as cast in spool-wound wire, and interferes with the generally desired capability to be fed into the center of the heat source to obtain a maximum filler melt-off rate. The spring-controlled centering configuration would allow the nozzle to be basically independent of the electrode lateral position in the joint. In the override mode, the nozzle is operator controlled to have the desired dependent position with respect to the electrode lateral position.

Referring to FIG. 5A, the contact tube 63 can be formed by flattening a tube having a round hole. Alternatively, the contact tube is formed by resistance spot welding four strips of sheet material in a rectangular configuration. In accordance with yet another alternative, the contact tube is an assembly fabricated by forming a flat side on each of two tubes having round cross sections and then joining the flat sides together. This fabrication technique can be extended to provide a filler nozzle consisting of more than two tubes joined in a planar array. For hot-wire welds, the tube or tubes may be made of a material with similar properties, preferably one with high electrical conductivity, such as copper.

In accordance with the preferred embodiment, the contact tube 63 is fabricated by flattening a circular tube into a non-circular cross section. In the example shown in FIGS. 5A and 5B, the flattened sides of the tube are generally parallel and the rounded ends are semicircular in cross section with an inner radius greater than the radius of the filler wires. The height of the guide channel inside the contact tube must be greater than two times the wire diameter. Alternatively, the filler nozzle may have an elliptical or oval cross section.

In FIG. 5, the height direction of the non-circular nozzle 64 lies in the plane of the joint. Likewise the curvature of the nozzle lies in the plane of the joint. However, it will be readily appreciated that the end of the nozzle may be straight.

In accordance with a second preferred embodiment, the contact tube can be fabricated from two tubes, each tube having a flat face machined thereon to form a "D" shape, with the flat faces of the "D"-shaped tubes being soldered or brazed together with minimal wall thickness remaining at the joint. Alternatively, the contact tube is fabricated from individual D-shaped tubes having machined flat faces soldered or brazed together with no wall thickness remaining at the joint, i.e., each tube is machined down to the inner periphery. Optionally, the machined tubes can have their flat faces cut at a small angle relative to the centerline of the uncut tube, so as to provide convergence of the wires passing through the holes to a common point at the work surface during their use. Preferably, the filler wires exiting the nozzle travel in directions that converge near or at the focus (highest energy density/temperature portion) of the heat source for more thermally efficient and faster capability melting.

The tubing used in the present invention can be made of tungsten (such as is produced by the chemical vapor deposition technique), or of other high-strength, wear-resistant material, such as metal carbide.

The reasons for using a non-circular nozzle apparatus include the following: a) to provide a lateral stiffness to the nozzle sufficient to maintain adequate filler metal position guidance, while providing only the minimum practical width (in a direction perpendicular to the walls) when used in joints of reduced width which would otherwise be too narrow to be filled; b) to provide increased nozzle flexural strength both parallel and perpendicular to the joint depth so that the desired filler metal guidance is maintained, despite inadvertent physical handling or abusive nozzle mechanized steering; and c) to provide a minimum nozzle width (in a direction perpendicular to the weld seam) so that the view in the joint from a remote weld-viewing camera is not obstructed by the portion of the nozzle passing through the view.

In the present invention, curved holes for the filler guide path are preferred over straight holes for the following functional reasons:

a) One benefit of curved holes is that they maintain planar alignment and convergence of the typically curved filler materials as they exit the nozzles. The remaining curvature ("cast") of the fillers after they have been unwound from a spool can lead to significant deviation from their respective aim positions if the direction of the curvature is allowed to find its own azimuthal position with respect to the axis of the nozzle hole.

b) A second benefit of the curved nozzle is the significantly shorter length of nozzle that is required to reach from the outside of a joint to the root area. This feature becomes more important either as the thickness of the materials being joined increases, or as the filler entry angle (with respect to the surface of the root) decreases.

c) A third benefit is that as the curvature of the nozzle approaches the approximate curvature of the filler (rather than forcing the filler to a straight configuration within the nozzle), the sliding friction between the filler and the filler nozzle diminishes. This reduction in friction allows the reliable feeding of finer (more thermally efficient melting) filler materials without the inherently increased risk of buckling at unsupported portions of the length in axial compression, such as occurs downstream of the feeder mechanism.

d) A fourth benefit is that the preferred shorter nozzle, as described in ¶ b) above, will be lighter for a predetermined cross-sectional shape, in turn reducing the load requirements for stable positioning for other manipulators of the torch assembly, such as oscillation and voltage control actuators.

e) A fifth benefit for curved, shorter nozzles is that they are stiffer and can therefore maintain an improved filler material aim point during rough handling or use, for a predetermined cross-sectional shape of the nozzle.

f) A sixth benefit, applicable to multiple-filler-type nozzles, is that when the filler holes are located on opposite edges of a flat stiffener having a different radius of curvature on each edge, fillers having different degrees of curvature ("cast") can be selectively fed through the hole having the closest match in curvature, in turn obtaining the benefit noted in ¶ c).

The foregoing preferred embodiments of the invention have been disclosed for the purpose of illustration. Variations and modifications of the disclosed structure will be readily apparent to practitioners skilled in the art of welding. All such variations and modifications which do not depart from the concept of the invention are intended to be encompassed by the claims set forth hereinafter.

We claim:

1. An apparatus comprising:
    first and second components to be welded, said first and second components forming a groove having a bottom;
    a welding electrode having an electrode tip at an end thereof, said electrode tip being located in said groove; and
    a hot-wire nozzle for guiding filler material to a location in the path of an arc from said electrode tip, said hot-wire nozzle comprising:
        a contact tube made of electrically conductive material and having a channel with an outlet at a distal end thereof, said outlet being located in said groove; and
        an outer sheath surrounding and supporting said contact tube.

2. The apparatus as defined in claim 1, wherein said channel of said contact tube has a non-circular cross section with a first dimension generally aligned with a plane of the groove and a second dimension generally perpendicular to said plane, said first dimension being greater than said second dimension.

3. The apparatus as defined in claim 1, further comprising first and second layers of electrically insulating material arranged between said contact tube and said outer sheath.

4. The apparatus as defined in claim 3, wherein each of said first and second layers of electrically insulating material comprises a coating deposited on a respective inner surface of said outer sheath.

5. The apparatus as defined in claim 3, wherein each of said first and second layers of electrically insulating material comprises a coating deposited on a respective outer surface of said contact tube.

6. The apparatus as defined in claim 1, further comprising first and second springs mounted to the outer surfaces of said outer sheath on opposite sides thereof.

7. The apparatus as defined in claim 1, wherein a chamber is formed between a portion of said contact tube and a portion of said outer sheath, further comprising a gas delivery tube arranged inside said chamber, said gas delivery tube having an outlet located near said outlet of said contact tube.

8. The apparatus as defined in claim 7, further comprising gas diffusing means incorporated in said outer sheath and in flow communication with said outlet of said gas delivery tube.

9. The apparatus as defined in claim 8, wherein said gas diffusing means comprises a microdrilled section of said outer sheath.

10. An apparatus comprising:
    first and second components to be welded, said first and second components forming a groove having a bottom;
    a welding electrode having an electrode tip at an end thereof, said electrode tip being located in said groove;
    a hot-wire nozzle for guiding filler material to a location in the path of an arc from said electrode tip, said hot-wire nozzle comprising a contact tube made of electrically conductive material and having a channel with an outlet at a distal end thereof, said outlet being located in said groove, and an outer sheath surrounding said contact tube; and
    first and second layers of electrically insulating material arranged between said contact tube and said outer sheath, wherein each of said first and second layers of electrically insulating material comprises a sheet of mica.

11. An apparatus comprising:
    first and second components to be welded, said first and second components forming a groove having a bottom;
    a welding electrode having an electrode tip at an end thereof, said electrode tip being located in said groove; and
    a hot-wire nozzle for guiding filler material to a location in the path of an arc from said electrode tip, said hot-wire nozzle comprising a contact tube made of electrically conductive material and having a channel with an outlet at a distal end thereof, said outlet being located in said groove, and an outer sheath surrounding said contact tube, wherein said outer sheath comprises first and second sheets of material joined along first and second edges to form a structure having a lenticular cross section.

12. A hot-wire nozzle for guiding filler material into a welding groove, comprising:
    a contact tube made of electrically conductive material and having a channel with an outlet at a distal end thereof, said channel having a first non-circular cross section; and an outer sheath surrounding and supporting said contact tube and having a second non-circular cross section different than said first non-circular cross section.

13. The hot-wire nozzle as defined in claim 12, further comprising first and second layers of electrically insulating material arranged between said contact tube and said outer sheath.

14. The hot-wire nozzle as defined in claim 13, wherein each of said first and second layers of electrically insulating material comprises a coating deposited on a respective inner surface of said outer sheath.

15. The hot-wire nozzle as defined in claim 13, wherein each of said first and second layers of electrically insulating material comprises a coating deposited on a respective outer surface of said contact tube.

16. The hot-wire nozzle as defined in claim 12, wherein said contact tube comprises a tube having flattened sides along at least a portion thereof.

17. The hot-wire nozzle as defined in claim 12, further comprising first and second springs mounted to the outer surfaces of said outer sheath on opposite sides thereof.

18. The hot-wire nozzle as defined in claim 12, wherein a chamber is formed between a portion of said contact tube and a portion of said outer sheath, further comprising a gas delivery tube arranged inside said chamber, said gas delivery tube having an outlet located near said outlet of said contact tube.

19. The hot-wire nozzle as defined in claim 12, further comprising gas diffusing means incorporated in said outer sheath and in flow communication with said outlet of said gas delivery tube.

20. The hot-wire nozzle as defined in claim 19, wherein said gas diffusing means comprises a microdrilled section of said outer sheath.

21. A hot-wire nozzle for guiding filler material into a welding groove, comprising:
   a contact tube made of electrically conductive material and having a channel with an outlet at a distal end thereof, said channel having a non-circular cross section;
   an outer sheath surrounding said contact tube and having a non-circular cross section; and
   first and second layers of electrically insulating material arranged between said contact tube and said outer sheath, wherein each of said first and second layers of electrically insulating material comprises a sheet of mica.

22. A hot-wire nozzle for guiding filler material into a welding groove, comprising:
   a contact tube made of electrically conductive material and having a channel with an outlet at a distal end thereof, said channel having a non-circular cross section; and
   an outer sheath surrounding said contact tube and having a non-circular cross section, wherein said outer sheath comprises first and second sheets of material joined along first and second edges to form a structure having a lenticular cross section.

23. A hot-wire nozzle comprising:
   a contact tube made of electrically conductive material and having a channel with an outlet at a distal end thereof;
   a outer sheath made of structural material and surrounding at least said distal end of said contact tube, said outer sheath comprising first and second walls which exert compressive force on first and second sides of said contact tube; and
   first and second layers of electrically insulating material, said first layer of electrically insulating material extending between and in contact with said first side of said contact tube and said first wall of said outer sheath, and said second layer of electrically insulating material extending between and in contact with said second side of said contact tube and said second wall of said outer sheath.

24. The hot-wire nozzle as defined in claim 23, wherein said structural material is Inconel sheet stock.

25. The hot-wire nozzle as defined in claim 23, wherein said structural material is stainless steel sheet stock.

26. The hot-wire nozzle as defined in claim 23, wherein said first and second walls of said outer sheath are joined along first and second edges to form a structure having a lenticular cross section.

27. The hot-wire nozzle defined in claim 26, wherein a portion of said contact tube and portions of said first and second walls of said outer sheath form a chamber, further comprising a gas delivery tube arranged inside said chamber, said gas delivery tube having an outlet located near said outlet of said contact tube.

* * * * *